Patented May 30, 1939

2,160,095

UNITED STATES PATENT OFFICE 2,160,095

COMPOSITIONS FOR FLUID TRANSMISSION OF POWER

William Percival Smith, London, England

No Drawing. Application July 17, 1937, Serial No. 154,320. In Great Britain November 18, 1933

10 Claims. (Cl. 252—5)

This invention relates to compositions for fluid transmission of power, and the present application is filed as a continuation in part of my application for patent for improvements in or relating to Compositions for fluid transmission of power, Serial No. 743,011, filed September 6, 1934.

Recent developments in the design of fluid pressure brakes in automobiles have imposed more exacting conditions on fluid transmission compositions in that such compositions are required to stand a much higher temperature than formerly and many compositions hitherto found suitable for this purpose have been found to vaporize at the temperatures to which they are now subjected, and it is one object of this invention to provide a liquid with an unusually high vaporizing point while retaining the properties which are well known to be essential for these liquids, such as low freezing point, constant viscosity over a large range of temperature and absence of action on the metal and rubber parts of the mechanism.

Castor oil, on account of its constant viscosity over a wide range of temperatures has been used largely as a fluid for transmission of power, in particular in fluid braking systems, and in order to overcome as far as possible the alleged detrimental effect of castor oil upon the rubber parts of the mechanism, alcohol has been added to the castor oil.

It has also been proposed to incorporate with castor oil certain esters of the type of di-butyl-phthalate with a view to obtaining a solution which is more stable and gives a more constant viscosity of the castor oil with change of temperature.

I have now found that the acetic acid esters of polyhydric alcohols are pre-eminently suitable as constituents for brake fluids and liquids for other fluid transmission systems because the resultant liquid will remain in the liquid state down to a very low temperature and will withstand very high temperatures without appreciable vaporisation. In particular I have found triacetin to be pre-eminently suitable as a constituent for brake fluids because it remains liquid down to a temperature of −50° C. and has a boiling point of 258° C. I have found, however, that other polyhydric alcohol esters of acetic acid give highly satisfactory results when incorporated with castor oil as brake fluids, but generally speaking the esters of polyhydric alcohols containing more than three hydroxyl groups are of no importance for the purpose of this invention.

One difficulty, however, has been to make a compatible solution of the polyhydric alcohol ester with the castor oil because triacetin and some of the other acetic acid esters of polyhydric alcohols are not miscible in the proportions which give the best results for the purpose of the present invention, and it was therefore necessary in such cases to find a suitable solubilizing agent which would not to any appreciable extent adversely affect the desirable properties attained by the association of the acetic acid ester with the castor oil.

I have now found that the glycol ethers generally as a class are suitable solubilising agents, and more particularly the butyl ethers of both ethylene glycol and di-ethylene glycol are specially good solubilisers. The ethyl ether of ethylene glycol is also suitable but the ethyl ether of di-ethylene glycol is not itself sufficiently compatible with castor oil to be used with proportions of castor oil greater than about 10% unless some butyl ether is also employed with it.

Certain of the polyhydric alcohol acetic acid esters are compatible with castor oil in considerable proportions without the aid of a solubilising agent, while only a very small proportion of triacetin can be brought into compatibility with castor oil without the aid of a solubilising agent, but minute quantities can, however, be brought into compatibility therewith. The present invention is, however, only concerned with castor oil compositions containing in addition to the acetic acid ester a glycol ether as solubilising agent in order to bring about or ensure compatibility with the castor oil.

According to the present invention, therefore, a liquid for transmission of power consists of castor oil, a glycol ether and an acetic acid ester of a polyhydric alcohol containing before esterification not more than three hydroxyl groups in the molecule.

The following specific examples of brake fluids are typical embodiments of the present invention, but while I have described my invention as applicable to fluid brake systems, it is to be understood that my invention includes liquids equally applicable to fluid power transmission means other than those used in brakes. The proportions given are by volume.

Example 1

| | Percent |
|---|---|
| Castor oil | 50 |
| Diethylene glycol mono butyl ether | 25 |
| Triacetin | 25 |

The amount of glycol ether must be sufficient to render the triacetin compatible with the castor oil. For this purpose, the minimum quantity necessary to retain the castor oil in solution is 50% of the amount of triacetin, but equal quantities of diethylene glycol mono butyl ether and triacetin have been found to give the best results for the purpose of brake fluids.

The composition may be prepared simply by mixing the ingredients, but preferably the glycol ether and the triacetin are first mixed and then added to the castor oil. The triacetin may be prepared by any of the well known methods, for example, by heating glycerol with glacial acetic acid and potassium disulphate to form diacetin which is separated and treated with acetic anhydride.

A composition constituted as above will not gas in service until it reaches a temperature in the neighborhood of 190° C.

*Example 2*

|  | Percent |
|---|---|
| Castor oil | 50 |
| Diethylene glycol mono butyl ether | 25 |
| Diacetin | 25 |

This composition is prepared exactly as in Example 1, and the properties are very similar.

*Example 3*

|  | Percent |
|---|---|
| Castor oil | 60 |
| Ethylene glycol diacetate | 30 |
| Diethylene glycol mono butyl ether | 10 |

The acetic acid esters of the glycols are more easily compatible with castor oil than similar esters of glycerol but in the proportions given above a solubilising agent is necessary in order to avoid danger of separation of the castor oil from the glycol ester.

*Example 4*

|  | Percent |
|---|---|
| Castor oil | 50 |
| Mono acetin | 25 |
| Diethylene glycol mono butyl ether | 25 |

Mono acetin will mix with castor oil to the extent of about 5% to form a compatible solution without the aid of a solubilising agent, but a solution containing 10% of mono acetin eventually shows signs of separation even when the solution has been obtained by heating to 100° C. For the purpose of brake fluids, however, a greater proportion of mono acetin than 5% is desirable.

In the above examples, the pharmaceutical quality castor oil has been found satisfactory, although any suitable neutralising operation may be carried out upon such of the compositions as are improved by this treatment. "Blown" or miscible oils are of high acidity and have no corresponding advantages.

Anticorrosion agents, coloring matter and special additions for the purpose of obtaining exceptionally low freezing points or to form a protective coating as a residue when the brake fluid is evaporated by over-heating, may be added to the composition according to the invention.

Compositions prepared according to the invention are found to have a very high vaporisation or gassing point, in some instances in the neighborhood of 200° C. and the fluids are without any detrimental action upon the rubber or metal parts used in fluid brake systems.

Solubilisers other than the glycol ethers will bring about compatibility between castor oil and acetic acid esters of polyhydric alcohols, but may affect seriously the valuable properties of the solution as a medium in fluid transmission mechanism. While the invention has been described mainly with reference to diethylene glycol mono butyl ether as solubilising agent, other glycol ethers may be employed in exactly the same way as the mono butyl ether, in particular, the mono ethyl ether of ethylene glycol, and give liquids admirably suited for fluid transmission purposes. Other high boiling point solvents for oils than the glycol ethers have not been found as suitable for the purpose of solubilising agents as the glycol ethers with the exception of diacetone alcohol which gives results comparable with the glycol ethers in most instances.

It will be appreciated that while compositions containing acetic acid esters of ethylene glycol and glycerol have been more particularly described herein, esters of other di- and tri-hydric alcohols may be used similarly, in particular those of butylene and propylene glycol. Furthermore, mixtures of any of the acetic acid esters hereinbefore mentioned may be employed.

What I claim is:

1. A liquid for transmission of power consisting of castor oil, an acetic acid ester of a polyhydric alcohol containing before esterification not more than three hydroxyl groups in the molecule, and a glycol ether.

2. A liquid for transmission of power consisting of castor oil, an acetic acid ester of a polyhydric alcohol containing before esterification not more than three hydroxyl groups in the molecule, and a glycol butyl ether.

3. A liquid for transmission of power consisting of castor oil, an acetic acid ester of a polyhydric alcohol containing before esterification not more than three hydroxyl groups in the molecule, and an ether of ethylene glycol.

4. A liquid for transmission of power consisting of triacetin, castor oil and a glycol butyl ether.

5. A liquid for transmission of power consisting of triacetin, castor oil and the mono ethyl ether of ethylene glycol.

6. A liquid for transmission of power consisting of ethylene glycol di-acetate, castor oil, and ethylene glycol mono butyl ether.

7. A liquid for transmission of power consisting of:

(a) Castor oil and triacetin wherein the proportion of castor oil is approximately double that of the triacetin and (b) Sufficient of a glycol ether to render the triacetin compatible with the castor oil.

8. A liquid for transmission of power consisting of the following ingredients in the proportion by volume stated:—

|  | Percent |
|---|---|
| Castor oil | 50 |
| Triacetin | 25 |
| Diethylene glycol mono butyl ether | 25 |

9. A liquid for transmission of power consisting of triacetin, castor oil and solubilising agent consisting of a glycol ether.

10. A liquid for transmission of power consisting of triacetin, castor oil and di-ethylene glycol mono butyl ether.

WILLIAM PERCIVAL SMITH.